United States Patent
Masleid et al.

(10) Patent No.: US 7,802,223 B1
(45) Date of Patent: Sep. 21, 2010

(54) METHOD AND SYSTEM FOR CONFIGURABLE CONTACTS FOR IMPLEMENTING DIFFERENT BIAS DESIGNS OF AN INTEGRATED CIRCUIT DEVICE

(76) Inventors: Robert Paul Masleid, 17266 Eaton La., Monte Sereno, CA (US) 95930; Steven T. Stoiber, 1516 Richardson Ave., Los Altos, CA (US) 94024

( * ) Notice: Subject to any disclaimer, the term of this patent is extended or adjusted under 35 U.S.C. 154(b) by 195 days.

(21) Appl. No.: 11/018,880

(22) Filed: Dec. 20, 2004

(51) Int. Cl.
*G06F 17/50* (2006.01)
(52) U.S. Cl. .............................. 716/18; 716/1; 716/17
(58) Field of Classification Search .................. 716/18, 716/17, 1
See application file for complete search history.

(56) References Cited

U.S. PATENT DOCUMENTS

| | | | |
|---|---|---|---|
| 6,340,825 B1 * | 1/2002 | Shibata et al. .............. 257/207 |
| 6,429,727 B1 * | 8/2002 | Gibson et al. ............... 327/538 |
| 6,628,184 B1 * | 9/2003 | Cassagrande et al. ....... 335/132 |
| 7,073,147 B2 * | 7/2006 | Ikeda et al. .................... 716/9 |
| 2002/0175390 A1 * | 11/2002 | Goldstein et al. ........... 257/481 |
| 2003/0212974 A1 * | 11/2003 | Frerichs .......................... 716/8 |
| 2004/0004496 A1 * | 1/2004 | Madurawe .................... 326/39 |
| 2004/0128631 A1 * | 7/2004 | Ditzel et al. .................... 716/2 |
| 2004/0157378 A1 * | 8/2004 | Ikeda et al. ................. 438/128 |
| 2005/0138579 A1 * | 6/2005 | Narendra et al. ............... 716/2 |

OTHER PUBLICATIONS

Casu et al.,"Synthesis of Low-Leakage PD-SOI Circuits with Body-Biasing", Aug. 2001, International Symposium on Low Power Electronics and Design, Technical papers pp. 282-290.*

* cited by examiner

*Primary Examiner*—Sun J Lin

(57) ABSTRACT

In a computer implemented synthesis system, a fabrication method for an integrated circuit device. The method includes receiving a circuit netlist representing a first form of an integrated circuit design to be realized in physical form. A plurality of contacts of the netlist are accessed. The plurality of contacts are configured to implement a second form of the integrated circuit design.

17 Claims, 6 Drawing Sheets

300

500

METHOD AND SYSTEM FOR CONFIGURABLE CONTACTS FOR IMPLEMENTING DIFFERENT BIAS DESIGNS OF AN INTEGRATED CIRCUIT DEVICE

TECHNICAL FIELD

Embodiments of the present invention relate to body biasing circuits for providing operational voltages in integrated circuit devices.

BACKGROUND ART

As the operating voltages for CMOS transistor circuits have decreased, variations in the threshold voltages for the transistors have become more significant. Although low operating voltages offer the potential for reduced power consumption and higher operating speeds, threshold voltage variations due to process and environmental variables often prevent optimum efficiency and performance from being achieved. Body-biasing is one mechanism for compensating for threshold voltage variations, and functions by modifying the body bias potential of the transistor, allowing the threshold voltage of the transistor to be adjusted electrically. It is important that the design synthesis tools used to design the body biasing circuit components interoperate properly with integrated circuit designs that specify standard biasing.

DISCLOSURE OF THE INVENTION

Embodiments of the present invention provide a method and system for configurable contact libraries for implementing different bias designs of an integrated circuit device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Figure 1:
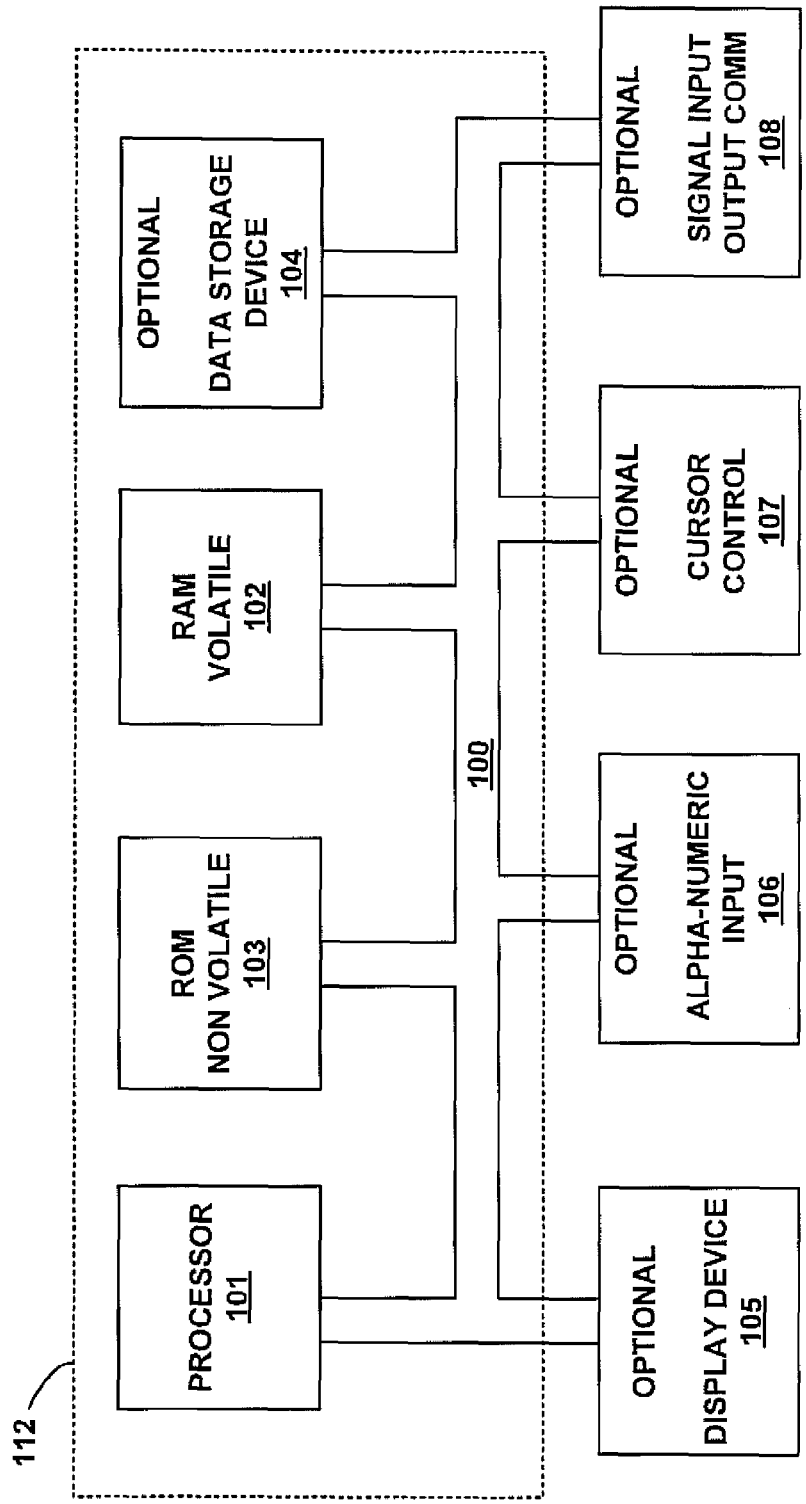
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "checking," "determining," "optimizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

Computer System Environment

Referring to FIG. 1, a computer system 112 is illustrated. Within the following discussions of the present invention, certain processes and steps are discussed that are realized, in one embodiment, as a series of instructions (e.g., software program) that reside within computer readable memory units of system 112 and executed by processors of system 112. When executed, the instructions cause computer system 112 to perform specific actions and exhibit specific behavior which is described in detail to follow.

Specific aspects of the present invention are operable within a programmed computer aided design (CAD) system. A CAD system 112 operable to implement the elements of the present invention is shown in FIG. 1. In general, the CAD system 112 of the present invention includes an address/data bus 100 for communicating information, one or more central processor(s) 101 coupled with bus 100 for processing information and instructions, a computer readable volatile memory unit 102 (e.g., random access memory, static RAM, dynamic RAM, etc.) coupled with bus 100 for storing information and instructions for the central processor(s) 101, a computer readable non-volatile memory unit 103 (e.g., read only memory, programmable ROM, flash memory, EPROM, EEPROM, etc.) coupled with bus 100 for storing static information and instructions for processor(s) 101. System 112 can optionally include a mass storage computer readable data storage device 104, such as a magnetic or optical disk and disk drive coupled with bus 100 for storing information and instructions. Optionally, system 112 can also include a display device 105 coupled to bus 100 for displaying information to the computer user, an alphanumeric input device 106 including alphanumeric and function keys coupled to bus 100 for communicating information and command selections to central processor(s) 101, a cursor control device 107 coupled to bus for communicating user input information and command selections to the central processor(s) 101, and a signal input/output device 108 coupled to the bus 100 for communicating messages, command selections, data, etc., to and from processor(s) 101.

Program instructions executed by the CAD system can be stored in RAM 102, ROM 103, or the storage device 104 and, when executed in a group, can be referred to as logic blocks or procedures. It is appreciated that data produced at the various logic synthesis stages of the present invention, including representations of the different levels of abstraction of the integrated circuit design, can also be stored in RAM 102, ROM 103, or the storage device 104 as shown in FIG. 1.

The display device 105 of FIG. 1 utilized with the computer system 112 of the present invention may be a liquid crystal device, cathode ray tube, or other display device suitable for creating graphic images and alphanumeric characters recognizable to the user. The cursor control device 107 allows the computer user to signal dynamically the two dimensional movement of a visible pointer on a display screen of the display device 105. Many implementations of the cursor control device are known in the art including a trackball, mouse, joystick, or special keys on the alphanumeric input device 105 capable of signaling movement of a given direction or manner of displacement.

EMBODIMENTS OF THE INVENTION

Embodiments of the present invention access an integrated circuit netlist representative of the integrated circuit design and configures a plurality of configurable contacts to implement a selected form of the integrated circuit design. In one embodiment, the contacts can be configured by a computer-aided design tool to implement a standard bias form of the integrated circuit design, or a body bias form of the integrated circuit design. For example, the body bias form of integrated circuit design is compatible with deep N-well (DNW) bias voltage distribution techniques. The configurable contacts can be altered at a cell level throughout the netlist.

Figure 2:
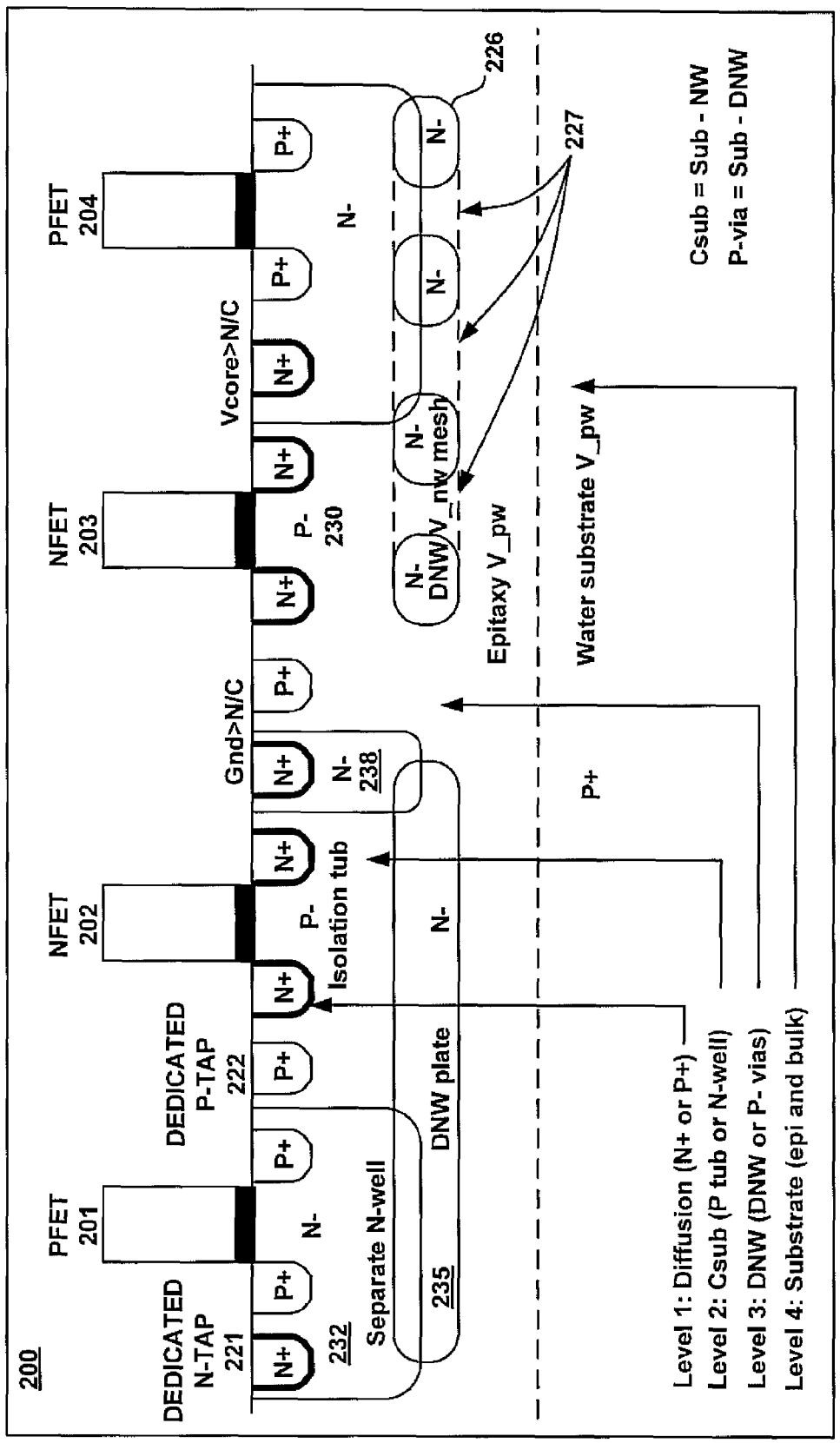
FIG. 2 shows an exemplary integrated circuit device in accordance with one embodiment of the present invention.

FIG. 2 shows an exemplary body biased integrated circuit device 200 in accordance with one embodiment of the present invention. As depicted in FIG. 2, the integrated circuit device 200 shows a plurality of connections to implement substrate body-biasing. For example, a regulation circuit (not shown) can be coupled to provide body bias currents to a PFET 201 through a dedicated bias tap 221, or to the NFET 202 through a dedicated bias tap 222.

Referring still to FIG. 2, a bias voltage distribution structure may use a deep N-well (DNW) mesh structure 226 to distribute bias voltages. The N-well bias (Vnw) may be distributed through the mesh structure 226 and the P-well bias (Vpw) may be distributed through the substrate and then up through holes 227 in the mesh structure 226 to the P-wells (e.g., P well 230). Bias-isolated Vnw regions are formed by N-wells (e.g., DNW plate 235) that are isolated from the DNW mesh structure 226 and provided dedicated N-taps (e.g., tap 221). Bias-isolated Vpw regions are formed by P-wells contained in isolated tubs (DNW floor 235, NW walls) and provided dedicated P-taps (e.g., tap 222). As shown in FIG. 2, the structures can be fabricated through different levels of ion implantation or diffusion. For example, a shallow diffusion can be used to form the source and drains of the transistors, and so on, as indicated.

Figure 3:
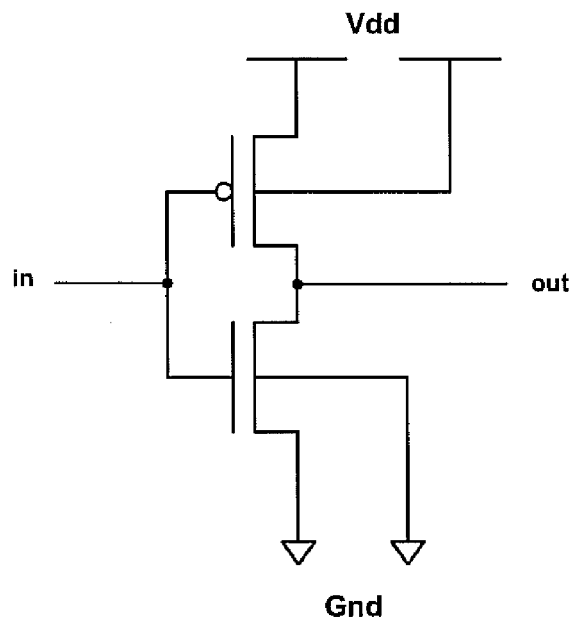
FIG. 3 shows a schematic diagram of an exemplary circuit element in accordance with one embodiment of the present invention.

FIG. 3 shows a schematic diagram 300 of an exemplary a circuit element in accordance with one embodiment of the present invention. As depicted in diagram 300, an exemplary inverter cell is shown, having connections to Vdd and Gnd, and having an input and output. Embodiments of the present invention comprise a computer implemented synthesis method and system for using configurable contacts (e.g., from a configurable contact library) to implement different forms, versions, alternative implementations, etc. of a given integrated circuit design. Embodiments of the present invention access, or otherwise receive, an integrated circuit netlist representative of the integrated circuit design that is to be realized in physical form (e.g., fabricated at a foundry facility). Using this netlist, a plurality of configurable contacts are accessed (e.g., by a computer-aided design tool) and appropriately configured to implement a selected form of the integrated circuit design.

In one embodiment, the contacts can be configured by the computer-aided design tool to implement a standard bias form of the integrated circuit design, or a body bias form of the integrated circuit design. The configurable contacts can be altered at a cell level throughout the netlist. Diagram 300 shows a schematic of an example of a standard bias version of the integrated circuit cell.

Figure 4:
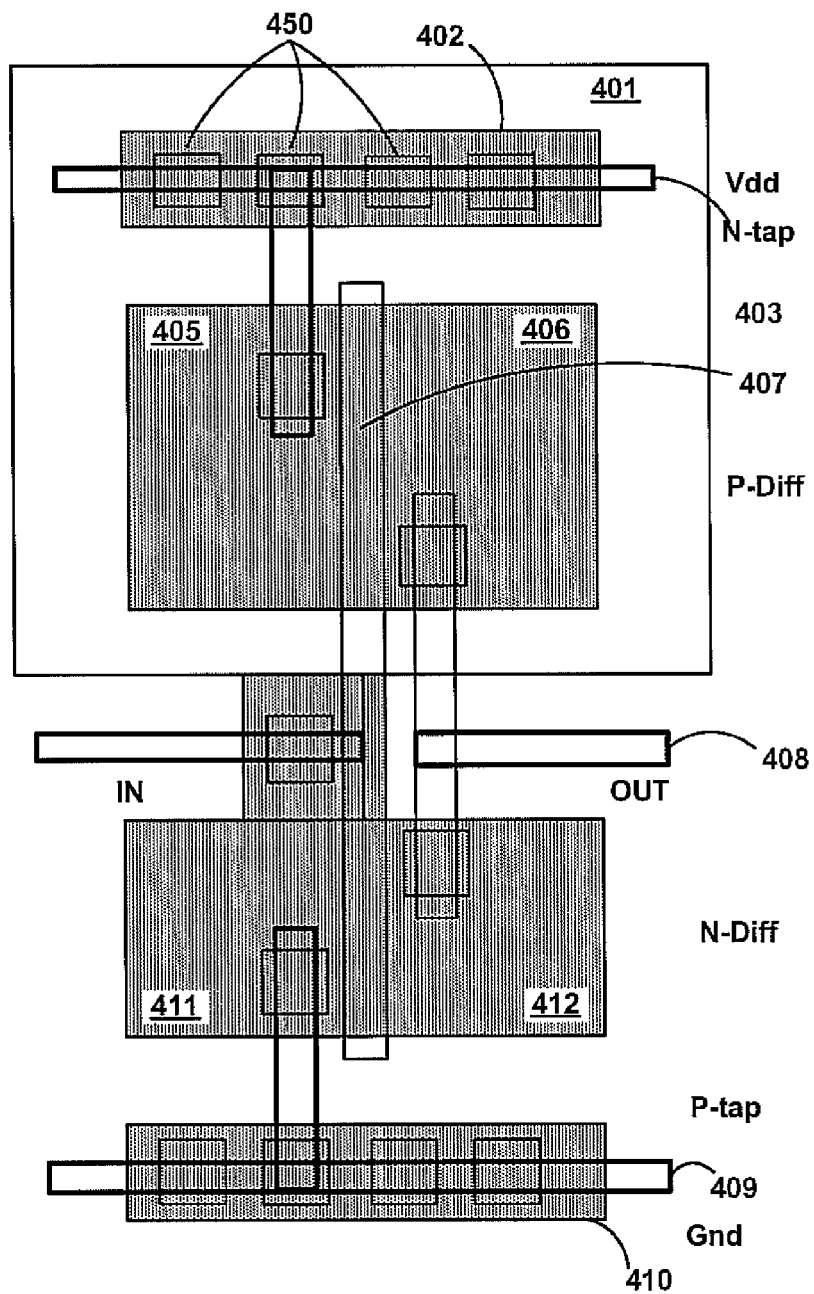
FIG. 4 shows a layout diagram depicting a layout of a schematic diagram in accordance with one embodiment of the present invention.

FIG. 4 shows a layout diagram 400 depicting the layout of the schematic diagram 300 (e.g., the exemplary inverter cell) in accordance with one embodiment of the present invention. As shown in diagram 400, a metal trace 403 is shown for distributing Vdd to the N-diffusion 402 residing in the N-well 401. A plurality of configurable contacts, depicted diagram 400 as small squares, couple the trace 403 to the N-diffusion 402 and to the source diffusion 405 (e.g., three of such contacts, of the plurality of contacts, are identified as shown by the lines 450). A gate 407 and the drain 406 are shown. A metal trace 408 connects to the drain 406 and a source 412 for the output, and the input is connected to the gate 407 as shown. A metal trace 409 (e.g., Gnd) is connected to a P-diffusion 410 and a drain 411.

As described above, the configurable contacts are depicted in diagram 400 as small squares (e.g., contacts 450, etc.). In one embodiment, to implement a standard bias version of the integrated circuit cell, the computer-aided design tool leaves the contacts within the netlist. When the configurable contacts are left within the netlist, they are used by mask generation tools to actually implement electrical contacts to the metal trace as depicted diagram 400. This results in the contacts being made when the integrated circuit is fabricated (e.g. a semiconductor fabrication foundry). In this manner, the contacts are regarded as being in the "closed" state.

Figure 5:
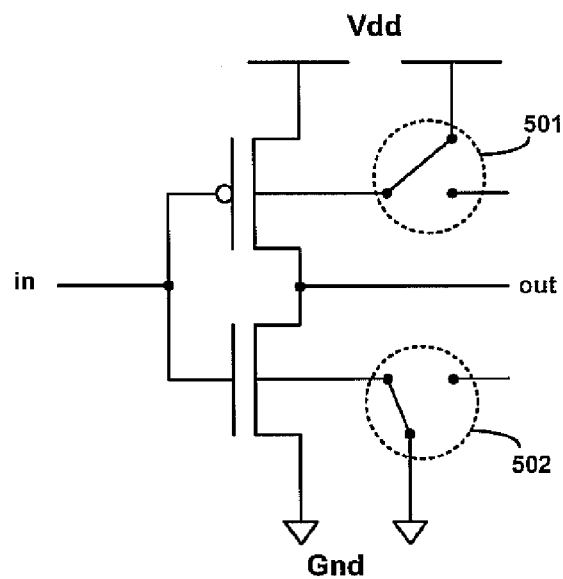
FIG. 5 shows a schematic diagram of an exemplary circuit element in accordance with one embodiment of the present invention.

FIG. 5 shows a schematic diagram 500 of a circuit element in accordance with one embodiment of the present invention. As depicted in diagram 500, in a manner substantially similar as shown in diagram 300, an exemplary inverter cell is shown, having connections to Vdd, Gnd, and having an input and output. The inverter cell of diagram 500, however, explicitly depicts the configurable contacts as switches 501-502. This illustrates the principle whereby the contacts can be viewed as switchable contacts, that can be configured in a closed state or an open state. When the contacts are configured as closed, the inverter cell of diagram 500 is a standard bias inverter cell, where for example N-well bias is connected directly to Vdd. When the contacts are configured as open, the inverter cell is a body bias inverter cell, where the N-well bias is connected to a bias distribution structure (e.g., mesh structure 226) as opposed to Vdd. This renders the inverter cell compatible with substrate body-biasing implementations as described above in the discussion of FIG. 2.

Figure 6:
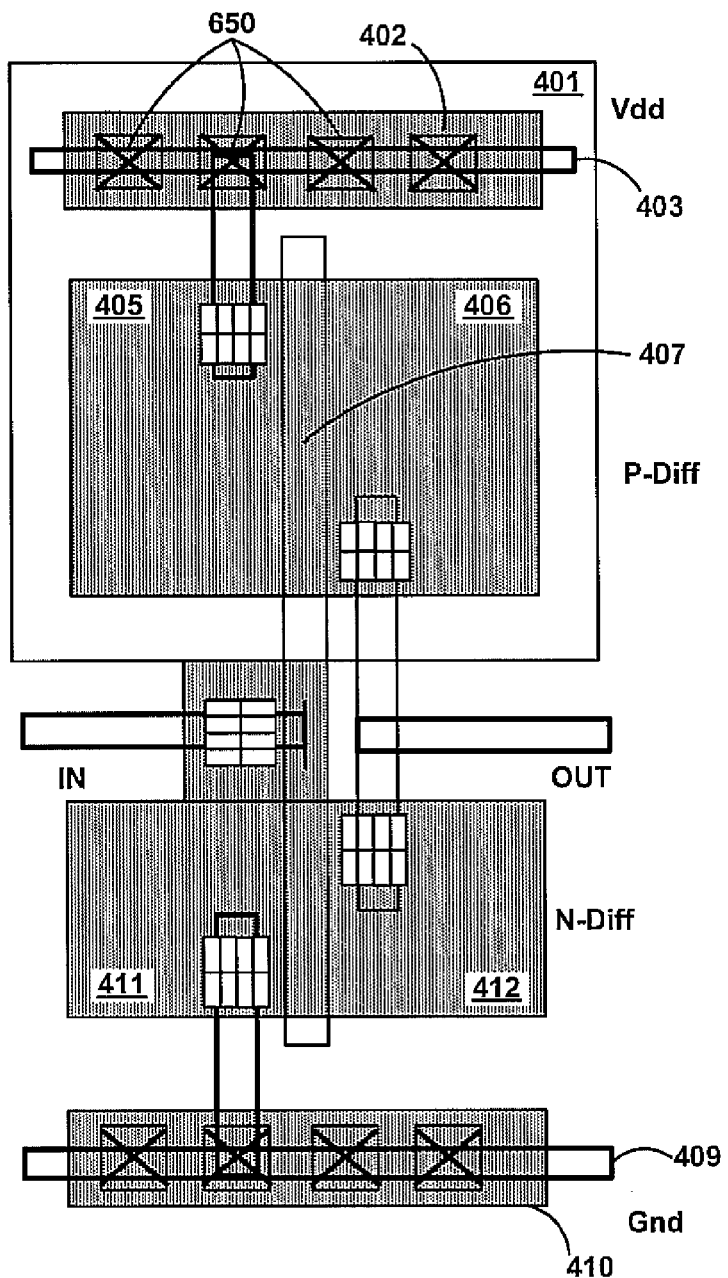
FIG. 6 shows a layout diagram depicting a layout of a schematic diagram in accordance with one embodiment of the present invention.

FIG. 6 shows a layout diagram 600 depicting the layout of the schematic diagram 500. The plurality of configurable contacts are depicted diagram 600 as small squares, however in this case, the configurable contacts are in an open state in the small squares depicted having an "x" through them. Three of such contacts, of the plurality of contacts, are identified as shown by the lines 650. Since the contacts are configured open, the inverter cell of diagram 600 is a body bias inverter cell. In one embodiment, as described above, to implement a body bias version of the integrated circuit cell, the computer-aided design tool does not implement the contacts within the netlist. When the configurable contacts are not implemented (e.g., or otherwise removed, ignored, etc.), the mask generation tools do not implement electrical contacts to the metal traces. This results in the contacts not being made when the integrated circuit is fabricated. In this manner, the contacts are regarded as being in the open state. As described above, this renders the inverter cell compatible with substrate body-biasing techniques described in the discussion of FIG. 2. Thus, in one embodiment the configurable contacts can be regarded as a netlist of circuit elements having two states, either open or closed. Alternatively, the configurable contacts can be regarded as circuit elements which are left within the netlist (e.g., in the closed state) or removed from the netlist (e.g., in the open state) by a computer-aided design tool depending upon whether a standard bias version or a body bias version of the integrated circuit design is desired.

Referring still to FIG. 6, one embodiment of the present invention manages contact configuration through the use of configurable, or switchable, contacts from a cell library. This facilitates a highly granular control of the configuration of the contacts within the netlist. For example, in one embodiment, one style of contact can be used for all contact purposes within the netlist. For example, in one embodiment, the configurable contacts in the library can be of two types, "+" type and "x" type. Type + is always kept (e.g., always closed). Type x configurable contacts are either open or closed depending upon whether a standard bias design or a body bias design is desired. For example, as described above, type x configurable contacts are closed (e.g., left within the netlist) for standard bias designs, and open (e.g., ignored within the netlist) for body bias designs.

It should be noted that since all instances of a configurable library cell can be the same, the nesting structure of the netlist of the integrated circuit design is undisturbed by the conversion between standard bias and body bias designs. In this manner, a configurable contact library allows fully hierarchical processing of the chip shape database for contact deletion and subsequent checking.

Additionally, it should be noted that although a configurable contact library method is particularly well suited to standard cell-based design, the method can be applied to any design where the contact-containing components (e.g. blocks, macros, power connection cells, etc.) are kept in libraries.

It should be noted that a configurable contact library allowing fully hierarchical processing can be executed by computer-aided design tools much more efficiently than other methods involving contact deletion. For example, in one method where comparatively simple contact deletion is used to convert conventional standard bias designs to body bias designs, contacts must be analyzed, selected, and removed from a "flattened" version of the integrated circuit design database. This flattened conversion of the integrated circuit design database is not hierarchical. This can require flat processing of the chip shape database for contact deletion and subsequent checking, which is much more demanding of computer system resources and executes with much less efficiency.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
receiving, by a design synthesis system, a circuit netlist, the circuit netlist designed to enable a first form or a second form of an integrated circuit design to be realized in a physical form;
accessing, by the design synthesis system, a plurality of contacts of the circuit netlist, wherein the plurality of contacts comprise configurable logically switchable contacts that correspond to selectively implementable physical contacts; and
configuring, using the design synthesis system, the configurable logically switchable contacts wherein the physical contacts are selectively directed to be implemented in the first form or the second form of the integrated circuit design.

2. The method of claim 1, wherein at least one of the plurality of contacts is configured as an open contact to implement the second form of the integrated circuit design.

3. The method of claim 1, wherein the first form of the integrated circuit design comprises a standard bias integrated circuit design.

4. The method of claim 1, wherein the second form of the integrated circuit design comprises a body bias integrated circuit design.

5. The method of claim 4, wherein at least one of the plurality of contacts is removed from the circuit netlist to implement the body bias integrated circuit design.

6. The method of claim 1, wherein at least one of the plurality of contacts is removed from the circuit netlist to implement the second form of the integrated circuit design.

7. A tangible computer-readable medium having instructions stored thereon, the instructions cause a computer to perform the following:
determining based on a netlist a plurality of cell elements of a cell that are representative of components of an integrated circuit design;
configuring a plurality of configurable contacts of the cell from a configurable contact library that specifies each configurable contact logically as a configurable switch that corresponds to a selectively implementable physical contact, wherein each of the plurality of configurable contacts has an open state and wherein the cell has a first form when the plurality of configurable contacts are in the open state and a second form when the plurality of configurable contacts are in the closed state; and directing the integrated circuit design to be implemented in the first form or the second form wherein the first form results in a open state netlist for the integrated circuit design and the second form results in an closed state netlist for the integrated circuit design.

8. The tangible computer-readable medium of claim 7, wherein the second form comprises a standard bias integrated circuit cell and the closed state netlist comprises a standard bias netlist.

9. The tangible computer-readable medium of claim 7, wherein the first form comprises a body bias integrated circuit cell and the open state netlist comprises a body bias netlist.

10. The tangible computer-readable medium of claim 7, wherein one of the plurality of configurable contacts is configured to the open state when the one of the plurality of configurable contacts is removed from the cell.

11. The tangible computer-readable medium of claim 7, wherein the cell is configured to be implemented in the second form and configured for use in a computer implemented synthesis process for a standard bias integrated circuit design.

12. The tangible computer-readable medium of claim 7, wherein the cell is configured to be implemented in the first form and configured for use in a computer implemented synthesis process for a body bias integrated circuit design.

13. A method, comprising:

accessing a circuit netlist representing an integrated circuit design using a design synthesis system, the circuit netlist including a plurality of configurable switchable contacts specified as configurable logical switches that correspond to selectively implementable physical contacts;

specifying one out of at least two different versions of an integrated circuit device using the design synthesis system, wherein a first of the at least two different versions comprises a standard bias configuration of the integrated circuit design, and wherein a second of the at least two different versions comprises a body bias configuration of the integrated circuit design;

automatically configuring the plurality of configurable switchable contacts of the circuit netlist using the design synthesis system to implement the standard bias configuration where the standard bias configuration is specified; and automatically configuring the plurality of configurable switchable contacts of the circuit netlist using the design synthesis system to implement the body bias configuration where the body bias configuration is specified.

14. The method of claim 13, wherein at least one of the plurality of configurable switchable contacts is configured as an open contact to implement the body bias configuration of the integrated circuit design.

15. The method of claim 13, wherein at least one of the plurality of configurable switchable contacts is removed from the circuit netlist to implement the body bias configuration of the integrated circuit design.

16. The method of claim 13, wherein each of the plurality of configurable switchable contacts has an open state and a closed state, and wherein the standard bias configuration is effected when the plurality of configurable switchable contacts are in the closed state and the body bias configuration is effected when the plurality of configurable switchable contacts are in the open state.

17. The method of claim 13, further comprising:

outputting a first netlist of the body bias configuration of the integrated circuit design from the design synthesis system;

outputting a second netlist of the standard bias configuration of the integrated circuit design from the design synthesis system; and providing access to the first netlist and the second netlist for producing a plurality of body bias integrated circuit devices and a plurality of standard bias integrated circuit devices, respectively.

* * * * *